United States Patent [19]
Hert et al.

[11] Patent Number: 5,708,088
[45] Date of Patent: Jan. 13, 1998

[54] MULTIPHASE THERMOPLASTIC COMPOSITION BASED ON POLYAMIDE RESIN CONTAINING AN ETHYLENE POLYMER WITH AN EPOXIDE FUNCTIONAL GROUP

[75] Inventors: Marius Hert, Serquigny; Patrice Perret, Glisolles, both of France

[73] Assignee: Elf Atochem S.A., Puteaux, France

[21] Appl. No.: 546,991

[22] Filed: Oct. 23, 1995

Related U.S. Application Data

[63] Continuation of Ser. No. 330,102, Oct. 27, 1994, abandoned, which is a continuation of Ser. No. 43,206, Apr. 5, 1993.

[30] Foreign Application Priority Data

Apr. 3, 1992 [FR] France ................................. 92 04091

[51] Int. Cl.$^6$ ............................. C08L 77/02; C08L 33/08
[52] U.S. Cl. ........................... 525/179; 525/183; 525/184
[58] Field of Search ................................. 525/179, 184, 525/183

[56] References Cited

FOREIGN PATENT DOCUMENTS 1241361  8/1971  United Kingdom.

*Primary Examiner*—Irina Zemel
*Attorney, Agent, or Firm*—Burns, Doane, Swecker & Mathis, L.L.P.

[57] ABSTRACT

The present invention relates to a multiphase thermoplastic composition based on polyamide resin containing at least one ethylene/alkyl (meth) acrylate/unsaturated epoxide terpolymer.

22 Claims, No Drawings

MULTIPHASE THERMOPLASTIC COMPOSITION BASED ON POLYAMIDE RESIN CONTAINING AN ETHYLENE POLYMER WITH AN EPOXIDE FUNCTIONAL GROUP

This application is a continuation of application No. 08/330,102, filed Oct. 27, 1994, now abandoned in turn, a file wrapper continuation of application No. 08/043,206, filed Apr. 5, 1993.

The invention relates to a multiphase thermoplastic composition which has improved impact strength.

The invention relates especially to a thermoplastic composition based on polyamide resin which has an improved impact strength, especially at low temperature, containing at least one ethylene polymer which has unsaturated units derived from epoxide.

Another subject of the invention is the articles obtained from the said composition.

Compositions with a matrix of polyamides and ethylene polymers are already known for their impact strength.

In particular EP 096,264 describes a material of high impact strength, containing:

(A) a thermoplastic nylon which has a relative viscosity of 2.5 to 5, and (B) from 5 to 60% by weight, relative to (A), of an uncrosslinked terpolymer consisting of:
  (a) 55 to 79.5% by weight of ethylene,
  (b) 20 to 40% by weight of at least one primary or secondary alkyl (meth)acrylate, and
  (c) 0.5 to 8% by weight of a functionally acidic monomer (for example maleic anhydride).

Patent EP 218,665 describes compositions containing 50 to 95% by weight of at least one polyamide resin and from 5 to 50% by weight of at least one ethylene polymer containing from 0.9 to 16 mol% of units derived from maleic anhydride and/or from at least one alkyl acrylate or methacrylate in which the alkyl group has from 1 to 6 carbon atoms.

The said ethylene polymer is present in the form of a mixture of ethylene/alkyl (meth)acrylate copolymer (A) and of ethylene/maleic anhydride/alkyl (meth)acrylate terpolymer (B), the weight ratio (A)/(B) being between ⅓ and 3.

Document EP-A-072,480 is also known, which describes an impact-resistant composition comprising from 50 to 90% by weight of polyamide, from 1 to 45% by weight of an ethylenic ionomer resin and from 0.5 to 40% by weight of an elastomeric ethylene copolymer.

Finally, U.S. Pat. No. 3,373,223 describes a polymer blend consisting essentially of 25 to 90% by weight of polyolefin, 5 to 70% by weight of polyamide and 1 to 10% by weight of an ethylene/(meth)acrylic acid copolymer.

However, although these compositions exhibit an improved impact strength when compared with the polyamide matrix employed by itself, this improvement nevertheless remains insufficient for many applications requiring an excellent impact strength especially at low temperature.

There has now been found a multiphase thermoplastic composition based on polyamide resin, which has an improved impact strength especially at low temperature, characterised in that it comprises (A) from 50% to 95% by weight of at least one polyamide resin and (B) from 5% to 50% by weight of:
  (a) 5% to 100% by weight of at least one ethylene/alkyl (meth)acrylate/unsaturated epoxide terpolymer (I) and of
  (b) 0 to 95% by weight of at least one polymer chosen from the group consisting of
    polyethylenes
    ethylene/alkyl (meth)acrylate copolymers (II),
    ethylene/alkyl (meth)acrylate/anhydride of unsaturated dicarboxylic acid terpolymers (III).

With regard to the unsaturated epoxides forming part of the terpolymer (I) there may be mentioned in particular aliphatic glycidyl esters and ethers such as glycidyl acrylate, glycidyl methacrylate, glycidyl maleate, glycidyl itaconate, vinyl glycidyl ether and allyl glycidyl ether.

Among these unsaturated epoxides use of glycidyl acrylate and glycidyl methacrylate is particularly preferred.

According to the present invention the terpolymer (I) includes from 0.2 to 5 mol% of at least one unit derived from an unsaturated epoxide and from 1 to 15 mol% of at least one unit derived from an alkyl acrylate or methacrylate and has a melt index of between 1 and 50 dg/min, measured according to NFT standard 51-016 (conditions: 190° C./2.16 kg load).

The alkyl group of the alkyl acrylate or methacrylate forming part of the terpolymer (I) in the copolymers (II) and in the terpolymers (III), which may be linear, branched or cyclic, has up to 10 carbon atoms.

By way of illustration of alkyl acrylate or methacrylate forming part of the terpolymer, the copolymers (II) and in the terpolymers (III) there may be mentioned in particular methyl acrylate, ethyl acrylate, n-butyl acrylate, isobutyl acrylate, 2-ethylhexyl acrylate, cyclohexyl acrylate, methyl methacrylate and ethyl methacrylate. Among these alkyl acrylates and methacrylates very particular preference is given to ethyl acrylate, n-butyl acrylate and methyl methacrylate.

According to the present invention the copolymers (II) contain from 1 to 20 mol% of units derived from alkyl acrylate or methacrylate and have a melt index of between 1 and 50 dg/min, measured according to standard 51-016 (conditions: 190° C./2.16 kg load).

According to the present invention the terpolymers (III) contain from 0.01 to 5, and preferably, 0.1 to 2 mol% of at least one unit derived from an anhydride of unsaturated dicarboxylic acid and from 3 to 20 mol% of at least one unit derived from an alkyl acrylate or methacrylate and have a melt index of between 1 and 50 dg/min, measured according to NFT standard 51-016 (conditions: 190° C./2.16 kg load).

By way of illustration of anhydride of unsaturated dicarboxylic acid forming part of the terpolymers (III) there will be mentioned itaconic anhydride, citraconic anhydride, 2-methylmaleic anhydride, 2,3-dimethylmaleic anhydride, bicyclo[2.2.2]oct-5-en-2,3-dicarboxylic anhydride and maleic anhydride.

Among these unsaturated dicarboxylic acid anhydrides the use of maleic anhydride is very particularly preferred.

Polyethylenes here refers to a high-density polyethylene of crystallinity higher than 30%, or a low-density polyethylene.

It has been found, in fact, that compositions with a polyamide matrix and with hitherto known polyolefinic compounds exhibit an impact strength which is improved but still insufficient for certain applications.

The Applicant Company has found that the use, as ethylene polymer, of 5% to 100% of an ethylene/alkyl(meth)acrylate/unsaturated epoxide terpolymer (I) and of 0% to 95% of a polymer chosen from the group consisting of polyethylenes, the copolymers (II) and the terpolymers (III) makes it possible to improve the impact strength of the compositions known hitherto, especially at low temperature.

Polyamide resin here refers to a resin produced by polycondensation of one or more amino acids such as aminocaproic, 7-aminoheptanoic or 11-aminoundecanoic acids or equimolar quantities of a saturated dicarboxylic acid containing from 4 to 12 carbon atoms with a diamine, the diamine containing from 4 to 14 carbon atoms. An excess of diamine may be employed so as to obtain an excess of amine end groups in relation to the carboxyl end groups in the polyamide.

By way of illustration of such resins there will be mentioned:

polyhexamethylene adipamide (polyamide 6—6),
polyhexamethylene azelaamide (polyamide 6–9),
polyhexamethylene sebacamide (polyamide 6–10)
polyhexamethylene dodecanediamide (nylon 6–12),
poly(undecanoamide) (polyamide 11).

It is also possible to employ in the present invention polyamides prepared by polycondensation of at least two of the monomers and polymers referred to above, and this results in copolyamides.

The polyamide resins of the present invention can also be produced by polymerisation of one or more lactams such as caprolactam, which produces polyamide 6, or lauryllactam, which produces polyamide 12.

These polyamide resins have a molecular mass of at least 5,000 and preferably a melting point higher than or equal to 80° C.

Stabilisers, mould release agents, lubricants, crystallisation accelerators, plasticisers, pigments, dyes or inorganic fillers can also be incorporated in the compositions. According to an alternative form it is also possible to rigidify the compositions described above by adding thereto a high proportion of inorganic fillers, advantageously up to 50 parts by weight of at least one inorganic filler per 100. parts by weight of the total of polyamide resin, copolymer and terpolymer. The inorganic filler, pulverulent or in the form of fibres or flakes, may, for example, be chosen from glass fibres, ballotini, mica, talc, clays, aluminates and silicates, for example those of calcium, alumina, alumina hydrate, carbon black, carbon or boron fibres, asbestos, magnesium or calcium oxides, hydroxides, carbonates and sulphates, iron oxides, antimony, zinc, titanium dioxide, barium sulphate, bentonite, diatomaceous earth, kaolin, silica such as quartz, and felspar.

The composition forming the subject of the present invention is obtained in a known manner by any melt-blending technique such as, for example, extrusion or working in an internal mixer.

A second subject of the present invention relates to articles obtained from at least one composition described above. These articles can be obtained by any conventional methods employed in the thermoplastics industry, especially injection-moulded articles or those obtained by extrusion (film, pipes, sheets, fibres, etc.).

The multiphase thermoplastic compositions obtained within the scope of the present invention have an improved impact strength, especially at low temperature, which makes them particularly advantageous for any application requiring this property, especially in the field of the motor vehicle and electronics industries, of domestic or industrial appliances and of sports articles.

The following examples illustrate the invention.

EXAMPLE 1 (COMPARATIVE)

A first control composition is considered, consisting of 80% by weight of a polyamide 6 of melting point equal to 220° C. (determined according to ASTM standard D 789) and with a density of 1.13 g/cm$^3$ (determined according to ISO standard R 1183 D) and of 20% by weight of an ethylene/n-butyl acrylate copolymer with a melt index of 2.5 dg/min (determined according to NFT standard 51-016 according to the conditions: 190° C./2.16 kg load) in which the proportion of butyl acrylate is 28% by weight.

The mixture is produced in a Buss PR 46 co-kneader at a screw speed of 250 revolutions per minute and at a stock temperature of 240° C. and then granulated.

The granules obtained are dried under reduced pressure at a temperature of 80° C. and are then injection-moulded in a Billion model 80/50 machine at a temperature of 250° C. and an injection pressure of 50 MPa into standardised test pieces (4×10×80 mm$^3$) to perform the Charpy impact strength according to ISO standard R 179.

The test pieces are conditioned for 14 days at 23° C. and 50% relative humidity and the impact strength is then carried out on prenotched test pieces. The Charpy impact strengths measured at different temperatures are expressed in kJ/m$^2$ and are recorded in the table below.

EXAMPLE 2 (COMPARATIVE)

A control composition consisting of the following is prepared according to the operating conditions of Example 1:

80% by weight of the polyamide 6 employed in Example 1,

20% by weight of a terpolymer with a melt index of 7 dg/min (determined according to NFT standard 51-016 according to the conditions: 190° C./2.16 kg) comprising 28% by weight of ethyl acrylate, 1.8% by weight of maleic anhydride and 72% by weight of ethylene.

The Charpy impact strength is measured on notched test pieces prepared according to the conditions described in Example 1.

The Charpy impact strengths obtained at different temperatures, expressed in kJ/m$^2$, are recorded in the table below.

EXAMPLE 3

A composition consisting of the following is prepared according to the operating conditions of Example 1:

80% by weight of the polyamide 6 employed in Example 1,

20% by weight of a terpolymer with a melt index equal to 5 dg/min ((NFT standard 5-016/conditions: 190° C./2.16 kg) comprising 25% by weight of ethyl acrylate, 8% by weight of glycidyl methacrylate and 67% by weight of ethylene.

The Charpy impact strength is measured on notched test pieces prepared according to the conditions described in Example 1.

The Charpy impact strengths obtained at different temperatures, expressed in kJ/m$^2$, are recorded in the table below.

EXAMPLE 4

A mixture M1 consisting of 10% by weight of the terpolymer of Example 3 and 90% by weight of the copolymer of Example 1 is prepared by blending in a Buss PR 46 co-kneader at a screw speed of 250 revolutions per minute and at a stock temperature of 120° C.

The mixture is granulated.

A composition consisting of the following is then prepared according to the operating conditions of Example 1:

80% by weight of the polyamide 6 employed in Example 1,

20% by weight of the mixture M1 prepared previously.

The Charpy impact strength is measured on notched test pieces prepared according to the conditions described in Example 1.

The Charpy impact strengths obtained at different temperatures, expressed in kJ/m$^2$, are recorded in the table below.

EXAMPLE 5

A mixture M2 is prepared according to the conditions of Example 4, consisting of 30% by weight of the copolymer of Example 1 and 70% by weight of the terpolymer of Example 3. A composition consisting of the following is then prepared according to the operating conditions of Example 1:

80% by weight of the polyamide 6 employed in Example 1,

20% by weight of the mixture M2 prepared previously.

The Charpy impact strength is measured on notched test pieces prepared according to the conditions described in Example 1.

The Charpy impact strengths obtained at different temperatures, expressed in kJ/m$^2$ are recorded in the table below.

EXAMPLE 6

A mixture M3 is prepared dry in a drum, consisting of:

40% by weight of the terpolymer of Example 2

60% by weight of the terpolymer of Example 3.

A composition consisting of the following is then prepared according to the operating conditions of Example 1:

80% by weight of the polyamide 6 employed in Example 1,

20% by weight of the mixture M3 prepared previously.

The Charpy impact strength is measured on notched test pieces prepared according to the conditions described in Example 1.

The Charpy impact strengths obtained at different temperatures, expressed in kJ/m$^2$, are recorded in the table below.

EXAMPLE 7 (COMPARATIVE)

A control composition is prepared, consisting of 80% by weight of a polyamide 6,6 with a melting point equal to 255° C. and density equal to 1.13 g/cm$^3$ and of 20% of the copolymer employed in Example 1.

The mixture is produced in a Buss PR 46 co-kneader at a screw speed of 250 revolutions per minute and at a stock temperature of 270° C., and is then granulated.

The granules obtained are dried under reduced pressure at a temperature of 80° C. and are then injection-moulded on a machine at a temperature of 280° C. and at an injection pressure of 50±10 MPa into standardised test pieces (4×10× 80 mm$^3$) in order to perform the Charpy impact strength according to ISO standard R 179.

The test pieces are conditioned for 14 days at 23° C. and 50% relative humidity and the impact strength is then carried out on the prenotched test pieces. The Charpy impact strengths obtained at different temperatures are expressed in kJ/m$^2$ and are recorded in the table below.

EXAMPLE 8

A composition consisting of the following is prepared according to the operating conditions of Example 7:

80% by weight of the polyamide 6,6 employed in Example 7,

20% by weight of the terpolymer of Example 3.

The Charpy impact strength is measured on notched test pieces prepared according to the conditions described in Example 1.

The Charpy impact strengths obtained at different temperatures, expressed in kJ/m$^2$, are recorded in the table below.

EXAMPLE 9

A composition consisting of the following is prepared according to the operating conditions of Example 7:

80% by weight of the polyamide-6,6 employed in Example 7,

20% by weight of the mixture M1 employed in Example 4.

The Charpy impact strength is measured on notched test pieces prepared according to the conditions described in Example 7.

The Charpy impact strengths obtained at different temperatures, expressed in kJ/m$^2$, are recorded in table below.

TABLE

| Values obtained for the Charpy impact strength (in kJ/m$^2$) | | | | | | | | | |
|---|---|---|---|---|---|---|---|---|---|
| EXAMPLES TEMPERATURE | 1 | 2 | 3 | 4 | 5 | 6 | 7 | 8 | 9 |
| 20° C. | 11 | 28 | 50 | 50 | NB* | NB* | 14 | 40 | 40 |
| −20° C. | 8 | 22 | 34 | 40 | 37 | 42 | 10 | 33 | 34 |
| −40° C. | 5.5 | 16 | 26 | 36 | 30 | 38 | 8 | 22 | 29 |

*NB = no break

We claim:

1. A multiphase thermoplastic composition based on polyamide resin; comprising the following:

(A) from 50% to 95% by weight of at least one polyamide resin and (b) from 5% to 50% of at least one mixture selected from the group consisting of:

(i) (a) terpolymer (I) which comprises an ethylene/alkyl (meth)acrylate/unsaturated epoxide; (b) polyethylenes and/or (c) copolymer II which comprises an ethylene/alkyl (meth)acrylate; and (ii) (a) terpolymer (I) which comprises an ethylene/ alkyl (meth)acrylate/unsaturated epoxide; (b) polyethylenes and/or (c) copolymer II which comprises an ethylene/alkyl (meth)acrylate; and (d) terpolymer III which comprises an ethylene/alkyl (meth) acrylate/unsaturated anhydride of dicarboxylic acid.

2. A composition according to claim 1, wherein the terpolymer (I) comprises from 0.2 to 5 mole percent of at least one unit derived from an unsaturated epoxide, from 1 to 15 mole percent of at least one unit derived from an alkyl acrylate or methacrylate and has a melt index of between 1 and 50 dg/min, measured according to NFT standard 51-016 (conditions: 190° C./2.16 kg load).

3. A composition according to claim 1, wherein the unsaturated epoxide in the terpolymer (I) is an aliphatic glycidyl ester.

4. A composition according to claim 3, wherein the aliphatic glycidyl ester is glycidyl methacrylate.

5. A composition according to claim 1, wherein the alkyl group of the alkyl acrylate or methacrylate forming part of the terpolymer (I) is linear, branched or cyclic and has up to 10 carbon atoms.

6. A composition according to claim 5, wherein the alkyl acrylate is ethyl acrylate.

7. A composition according to claim 1, wherein the copolymers (II) contain from 1 to 20 mole percent of units derived from alkyl acrylate or methacrylate and have a melt index of between 1 and 50 dg/min, measured according to NFT standard 51-016 (conditions: 190° C./2.16 kg load).

8. A composition according to claim 1, wherein the alkyl group of the alkyl acrylate or methacrylate forming part of the copolymers (II) is linear, branched or cyclic and has up to 10 carbon atoms.

9. A composition according to claim 8, wherein the alkyl acrylate is n-butyl acrylate.

10. A composition according to claim 1, wherein the terpolymers (III) contain from 0.01 to 5 mole percent of units derived from anhydride of unsaturated dicarboxylic acid and from 2 to 20 mole percent of units derived from an alkyl acrylate or methacrylate and have a melt index of between 1 and 50 dg/min, measured according to NFT standard 51-016 (conditions: 190° C./2.16 kg load).

11. A composition according to claim 10, wherein the terpolymers (III) contain from 0.1 to 2 mole percent of units derived from anhydride of unsaturated dicarboxylic acid.

12. A composition according to claim 1, wherein the anhydride or unsaturated dicarboxylic acid forming part of the terpolymers (III) is maleic anhydride.

13. A composition according to claim 1, wherein the alkyl group of the alkyl acrylate or methacrylate forming part of the terpolymers (III) is linear, branched or cyclic and has up to 10 carbon atoms.

14. A composition according to claim 13, wherein the alkyl acrylate is ethyl acrylate.

15. An article obtained from a composition according to claim 1.

16. A composition according to claim 2, wherein the unsaturated epoxide in the terpolymer (I) is an aliphatic glycidyl ester.

17. A composition according to claim 2, wherein the alkyl group of the alkyl acrylate or methacrylate forming part of the terpolymer (I) is linear, branched or cyclic and has up to 10 carbon atoms.

18. A composition according to claim 2, wherein the alkyl group of the alkyl acrylate or methacrylate forming part of the copolymers (II) is linear, branched or cyclic and has up to 10 carbon atoms.

19. A composition according to claim 10, wherein the anhydride or unsaturated dicarboxylic acid forming part of the terpolymers (III) is maleic anhydride.

20. A composition according to claim 11, wherein the anhydride or unsaturated dicarboxylic acid forming part of the terpolymers (III) is maleic anhydride.

21. A composition according to claim 10, wherein the alkyl group of the alkyl acrylate or methacrylate forming part of the terpolymers (III) is linear, branched or cyclic and has up to 10 carbon atoms.

22. The multiphase thermoplastic composition of claim 1 which possesses a Charpy impact strength at −40° C. which ranges from at least about 22 kJ/m$^2$ to about 36 kJ/m$^2$ and which at −20° C. possesses a Charpy impact strength ranging from at least about 33 kJ/m$^2$ to about 42 kJ/m$^2$.

* * * * *